United States Patent [19]

Haupt

[11] Patent Number: 4,501,601
[45] Date of Patent: Feb. 26, 1985

[54] PROCESS FOR MANUFACTURING GLASS FIBER OPTICAL WAVEGUIDES

[75] Inventor: Herbert Haupt, Moglingen, Fed. Rep. of Germany

[73] Assignee: International Standard Electric Corporation, New York, N.Y.

[21] Appl. No.: 492,460

[22] Filed: May 5, 1983

[30] Foreign Application Priority Data

May 13, 1982 [DE] Fed. Rep. of Germany ....... 3217965

[51] Int. Cl.³ .............................................. C03B 37/01
[52] U.S. Cl. ......................................... 65/2; 65/3.12; 65/13; 65/18.2; 65/18.4
[58] Field of Search ................... 65/2, 3.11, 18.2, 18.4, 65/13, 3.12

[56] References Cited

U.S. PATENT DOCUMENTS

| 2,207,217 | 7/1940 | Fodor | 65/18.2 X |
| 2,960,723 | 11/1960 | Stark | 65/13 |
| 3,177,057 | 4/1965 | Potter et al. | 65/18.2 |
| 4,414,012 | 11/1983 | Suto et al. | 65/18.2 |

FOREIGN PATENT DOCUMENTS

| 0020042 | 2/1977 | Japan | 65/2 |
| 0010316 | 1/1979 | Japan | 65/3.12 |
| 0160927 | 10/1982 | Japan | 65/3.12 |

Primary Examiner—Robert Lindsay
Attorney, Agent, or Firm—John T. O'Halloran; Peter R. Ruzek

[57] ABSTRACT

In the manufacture of optical fiber having a core of a core material and a cladding of a cladding material by drawing the fiber from an optical glass preform, the preform is manufactured by reacting a first plurality of initial reactants in their vapor state to obtan core material particles, by producing a coherent core body from the core material particles, by reacting a second plurality of initial reactants in their vapor state to obtain cladding material particles, by providing a coherent porous cladding on the core body from the cladding material particles, and by sintering the resulting composite body to convert the same into the preform. The core body can either be sintered before combining the same with the porous cladding material, or it may remain in its initial porous state until the sintering of the composite body. The core body may be produced by compressing the core material particles, either in a rigid mold by applying axial pressure in the radially inward directions to the flexible mold and through the same to the material confined therein. A similar approach can also be used with respect to the formation of the cladding body, except that the core body will now be centrically arranged in the mold cavity and hence the cladding body will be compressed around the same. However, the core body or the cladding body can also be produced from a firm body of the respective material, by being shaped from such firm body.

17 Claims, 10 Drawing Figures

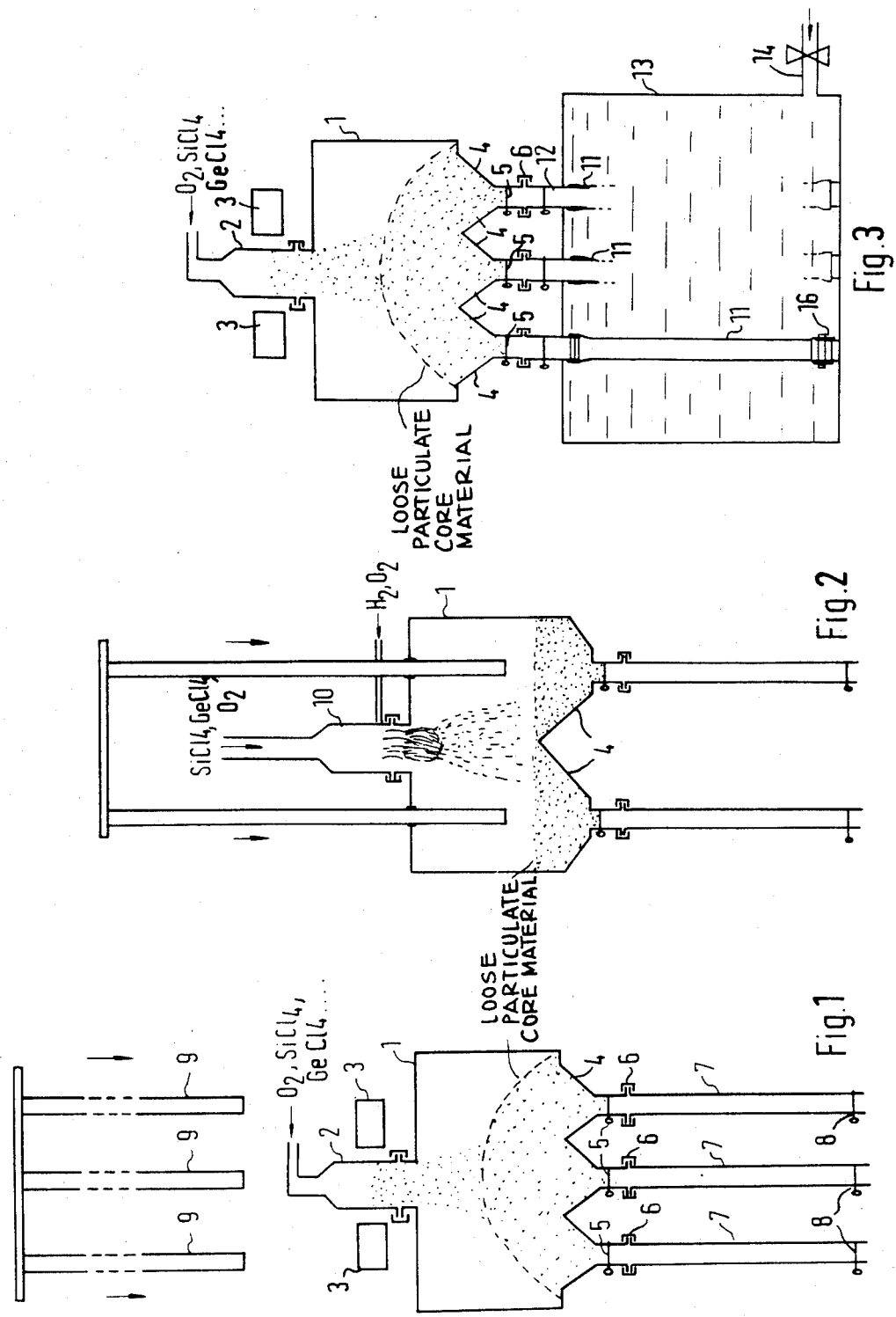

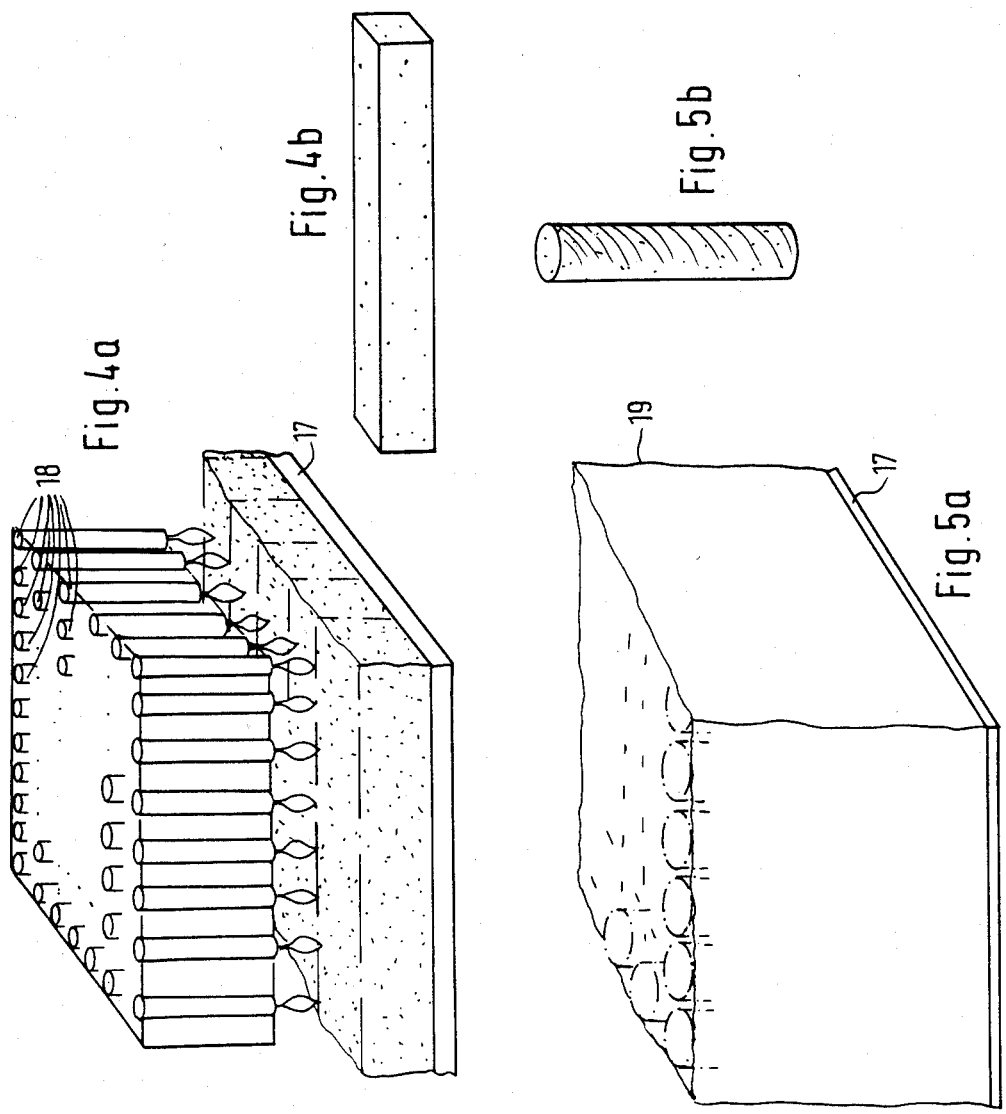

PROCESS FOR MANUFACTURING GLASS FIBER OPTICAL WAVEGUIDES

BACKGROUND OF THE INVENTION

The present invention relates to a process for manufacturing glass fiber optical waveguides having a core and a cladding, with the refractive index of the cladding being lower than the maximum refractive index of the core, in the course of which process a rod-shaped preform is manufactured and drawn into the glass fiber optical waveguide.

From German published patent application DE-AS No. 23 00 013, there is known a process in which particulate (soot-like) core material is produced by way of flame hydrolysis, and thereafter sintered into a glass body. The cladding material is thereafter deposited onto the rod-shaped substrate body by flame hydrolysis, and also sintered.

Accordingly, in this approach the shaping of the rod-shaped substrate body is independent of the chemical manufacture of the particulate core material, but the shaping of the cladding material is effected directly by way of deposition from the chemical reaction onto the substrate body. Since the core material as well as the cladding material are produced by flame hydrolysis in the open atmosphere, there is a danger in this process of causing impurities

SUMMARY OF THE INVENTION

Accordingly, it is a general object of the present invention to avoid the disadvantages of the prior art.

More particularly, it is an object of the present invention to develop a method of manufacturing optical glass preforms for the drawing therefrom of optical fibers having a core and a cladding, which method does not possess the disadvantages of the conventional methods of this kind.

Yet another object of the present invention is so to perform the method of the above type as to reduce the presence of impurities to a minimum, if not eliminate same altogether.

It is a concomitant object of the present invention to devise a method of the above type which is easy and inexpensive to perform, and yet brings about excellent and reliable results.

In pursuance of these objects and others which will become apparent hereafter, one feature of the present invention resides in a process for manufacturing glass preforms for use in drawing glass fiber optical waveguides therefrom, each having a core of a core material surrounded by a cladding of a cladding material with a refractive index lower than the maximum refractive index of the core material, comprising the steps of reacting a first plurality of initial reactants in their vapor state with one another to produce particles of the core material, producing a cohesive core body, including forming a cohesive porous core body from the particles of the core material; reacting a second plurality of initial reactants in their vapor state with one another to produce particles of the cladding material; providing a cohesive porous cladding body from the particles of the cladding material around the core body to thereby form a composite body; and sintering the cohesive core body and the cohesive porous cladding body into the glass preform.

BRIEF DESCRIPTION OF THE DRAWING

Above-mentioned and other features and objects of this invention will become more apparent by reference to the following description taken in conjunction with the accompanying drawings, in which:

FIG. 1 is a simplified cross-sectional view of an arrangement for producing loose particulate core material, and for pressing it in a rigid compression mold, FIG. 2 is a view similar to that of FIG. 1 but showing a modification of the arrangement, FIG. 3 is a view corresponding to that of FIG. 1 of an arrangement for producing loose particulate core material, in which the pressing is effected by applying a pressure from all sides, within a flexible compression mold, FIG. 4a is a perspective view of an arrangement for performing one type of process in which, for manufacturing the substrate body of core material, a solid plate is produced by way of flame hydrolysis, FIG. 4b is a perspective view of a cross-sectionally square substrate body preform produced from the plate of FIG. 4a, FIG. 5a is a view similar to that of FIG. 4a, in which, however, the plate has a greater thickness, FIG. 5b is a perspective view of a substrate body of core material produced from the plate of FIG. 5a, FIG. 6 is a view corresponding to those of FIGS. 1 and 3 of an arrangement for pressing the particulate cladding material onto a substrate body of core material with the aid of a rigid compression mold.

DETAILED DESCRIPTION OF THE PREFERRED EMBODIMENTS

Figure 8:
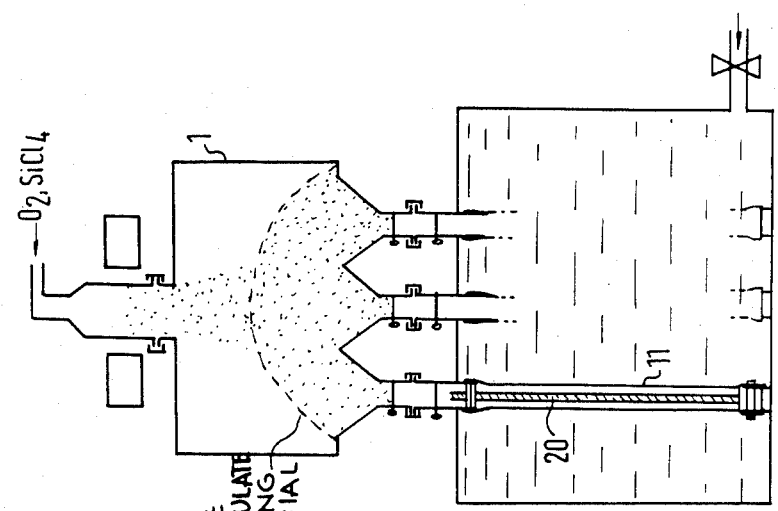
FIG. 8 is a view corresponding to that of FIG. 3 but of an arrangement for pressing loose particulate cladding material onto a substrate body of core material, with the pressing being performed by applying a pressure from all sides, within a flexible compression mold.

Referring now to the drawing in detail, it is first to be emphasized with respect to the following explanation of the various types of processes that each type of process for the deposition of cladding material can be combined with any of the described types of processes for forming the substrate body of core material. One of the main features of the novel fiber-making process is to be seen in the fact that the collection of the particulate material is separated from the forming of the desired preform. Therefore, in carrying out the chemical vapor phase reaction for producing the material, the geometrical conditions of the desired body do not have to be taken into consideration in any way. In fact, the chemical reaction can be optimized solely with a view to obtain the highest possible amounts of the produced material.

FIG. 1 shows a collecting trough 1 whose top side is provided with an intake port for the material to be collected. To this intake port, which is sealed against the outer atmosphere, there is connected a vertically extending reaction tube 2 in which the chemical vapor phase reaction necessary for producing the particulate material is to take place. As reagents for the chemical vapor phase reaction, as in the conventional chemical vapor deposition (CVD) process, silicon tetrachloride, germanium tetrachloride or, alternatively, a chloride of another doping agent together with oxygen in vapor form, are introduced into the tube 2. The energy required for performing the chemical vapor phase reaction inside the tube 2 is provided by an energy-generating device 3. This energy-generating device 3, as in the conventional CVD process, may be a ring burner, a resistance furnace or, alternatively, a plasma-producing device, such as a high-frequency coil or a microwave resonator. This process differs from the conventional CVD process especially in that the reaction is controlled in such a way that the oxidic reaction products do not precipitate on the wall of the reaction tube 2, but leave this tube 2 in the form of loose particles to then travel in direction towards the collecting trough 1. Instead of the reaction tube 2 with the energy-generating device 3, there may also be used a flame hydrolysis burner as is shown in FIG. 2. Within the collecting trough 1 in which, for the purpose of avoiding impurities, there is contained pure air, a pure oxygen atmosphere or a protective-gas atmosphere, such as a nitrogen or argon atmosphere, the resulting particles are collected in loose form at the bottom of the collecting trough 1.

The term "particulate material" as used herein is intended to mean the loose oxidic material obtained in the above manner, which is sometimes also referred to in this field as soot or white soot.

There is quite a number of ways of pressing the particulate core material that has been collected in the collecting trough 1 as a result of the described reaction, into a rod-shaped substrate body of core material. For example, the collecting trough 1, as shown in FIG. 1, may be provided at its bottom with several funnel-shaped openings 4 which are capable of being closed by means of slides 5. To each of these openings a tubular rigid compression mold 7 can be connected with the aid of a flange joint 6, so that the loose particulate core material that has been collected on the bottom of the collecting trough 1 runs into the mold 7 when the slide 5 is opened. Further slides 8 shut off the lower ends of the rigid tubular compression molds 7, which are sometimes also referred to as mold cavities. As soon as sufficient material has collected in the collecting trough 1 for filling the rigid compression molds 7, the arrangement 2, 3 at the top of the collecting trough 1 is moved away and replaced by an arrangement of parallel-extending plungers 9. In the course of the following compression process, these plungers 9 are pressed through openings (not shown) in the top side of the collecting trough 1, from above to below through the collecting trough 1, in the longitudinal direction of the compression molds 7, to press on the particulate material contained therein, so that this material is compressed in the axial direction and thus brought into a solid, but porous state. It is also conceivable for the pressing to be carried out in several steps, with the loose material being refilled from above to below between the individual steps.

The described molding process may be referred to as a uniaxial or unidirectional molding operation.

A device which is also suitable for the uniaxial molding is shown in FIG. 2 in which, unlike in FIG. 1, the device for producing the particulate core material which, in this case, is a flame-hydrolysis burner 10, does not have to be moved away prior to the molding operation. The funnel-shaped openings 4 in the bottom of the collecting trough 1 as shown in FIG. 2 are so designed that loose particulate core material is not piled up below the flame-hydrolysis burner 10. Rather, it collects in the lateral areas of the collecting trough 1. In all other respects, there is no significant difference between FIG. 2 and FIG. 1.

A molding process for forming the substrate body of core material that significantly differs from the above-described process is shown in FIG. 3. The particulate core material that is accumulating in the collecting trough 1, which does not have to differ from the trough 1 that is shown in FIG. 1, is filled from there, not into a rigid compression mold, but rather into a flexible compression mold 11. With the aid of the flexible compression mold 11, the particulate material, when subjected to uniform pressure from every side, can be compressed in a so-called isostatic press, and thus brought into a solid shape. For constituting the flexible compression molds 11, hose members are shown in FIG. 3 to be slipped over rigid tubular connecting pieces 12 which, with the aid of flange joints 6, are connected in the same way as the rigid compression molds 7 shown in FIGS. 1 and 2 to the outlet openings 4 of the collecting trough 1. The isostatic press is a fluid pressure chamber 13 which is tightly sealed on all sides, including the top side through which the connecting pieces 12 pass, with the pressure-exerting fluid being pressed into the pressure chamber 13 through an inlet pipe 14.

With the aid of slides respectively arranged at the connecting pieces 12, the compression mold 11 can be closed in the upward direction during the isostatic pressing operation. The lower ends of each of the hose members 11 are closed in that they are slipped tightly onto journals 16 arranged at the bottom of the pressure chamber 13. The isostatic press which is known per se and, therefore, does not need any detailed explanation, exerts a radial pressure upon the flexible hose member 11, and the pressure acting from every side upon the enclosed particulate core material is produced in such a manner that this core material, while subjected to the pressure exerted in the radial direction, is also pressed in the longitudinal direction of the mold 11 against the seals arranged at the top and bottom ends.

FIGS. 4 and 5 pertain to a process in which the substrate body of core material is not formed by compressing loose material. Here, unlike in the processes described herein before, the particulate material resulting from the aforementioned reaction is collected in such a way on a base 17 that it is changed from its loose form into a solid form which, however, is still porous, that is, not yet sintered. This is accomplished in that the location at which the particulate material is collected, either because of being near to the reaction zone, e.g., the flame of a flame-hydrolysis burner 18, or else by being otherwise heated, is so hot that the collected particles immediately solidify into a porous body. As the base 17 for collecting the material there is used in FIG. 4a a flat base plate, opposite which there is disposed an arrangement of the flame-hydrolysis burners 18. The flame-hydrolysis burners 18 of this arrangement extend parallel in relation to one another and substantially normal to the plane of the base 17, so that the particulate core material produced in the flames is deposited onto the base 17. Instead of an arrangement of parallel flame-hydrolysis burners 18 which, without having to be moved, cover one surface area of the base 17, it is also possible to use a linear arrangement of flame-hydrolysis burners 18, which is moved in one planar direction, or else to use a single flame-hydrolysis burner 18 which then, by being moved in two directions normal to one another, sweeps over the entire surface area to be covered. Instead of flame-hydrolysis burners 18 it is also possible to use reaction tubes of the type as shown in FIGS. 1 and 2, in which case, of course, the necessary heating of the location at which the particulate material is collected will have to be carried out with the aid of additional heating means.

The entire arrangement may be enclosed inside a sealed, high-purity chamber in order to protect the material deposited onto the base from impurities.

From the porous body formed on the base 17, the desired substrate bodies of core material may now be cut with the aid of mechanical cutting means.

A first way of doing this is that the body is produced in a layer the thickness of which substantially corresponds to or exceeds the diameter of the desired rod-shaped substrate body of core material, as is shown in FIG. 4a. From such a body it is now possible, by sawing, to obtain cross-sectionally square bar-shaped substrate body blanks of the type as shown in FIG. 4b which thereafter may be machined, for instance, in a lathe, into the desired shape of a rod of circular cross-section.

Another possibility is shown in FIG. 5a. It is possible to deposit on the base 17 and by employing the described process a porous laminated body whose height substantially corresponds to or exceeds the length of the desired substrate body of core material. In this case, the desired substrate body in the form of a rod of circular cross-section as shown in FIG. 5b, can be produced by being bored out of the porous body 19 normal to the plane of the base 17. If necessary, this rod-shaped substrate body must still be rounded to exact dimensions before being further processed.

In the course of further processing, the porous rod-shaped substrate body of core material produced in accordance with any one of the aforementioned possibilities, is still to be prepared for the deposition of the cladding material to be described hereinafter. To this preparation there belongs the removal of OH ions included in the porous material. These OH ions can be eliminated by subjecting the porous substrate body to a heat treatment in an atmosphere containing chlorine.

If the desired optical fiber is to have a gradient profile of the refractive index then, at this stage of manufacture, an additional treatment is required. For this purpose, refractive index reducing dopants are diffused into the porous rod-shaped substrate body. Since the concentration of these dopants increases radially from the center of the substrate body towards the outside, the refractive index is reduced in accordance with a radial profile from the inside towards the outside. An alternative or supplementary way resides in that the substrate body, already in the manufacturing stage, is uniformly provided with refractive index increasing dopants (such as $GeO_2$), and that a reduction of the refractive index in accordance with a radial profile from the inside towards the outside is accomplished by evaporation from the surface.

As soon as the porous substrate body has been subjected to such necessary treatments, the porous substrate body can be brought into its glassy state by way of sintering. Of course, the heating in the atmosphere containing chlorine may also be combined with the sintering process. It should be pointed out, however, that the substrate body of core material does not in all cases have to be sintered prior to the deposition of the cladding material. Sintering of the substrate body of core material may also be carried out simultaneously with the sintering of the deposited cladding material.

Figure 7:
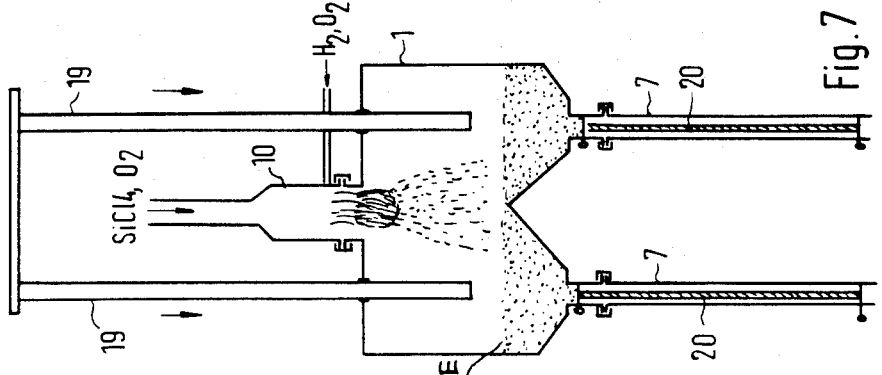
FIG. 7 is a view corresponding to that of FIG. 2 but of a modified arrangement for pressing loose particulate cladding material onto a substrate body of core material with the aid of a rigid compression mold.
Figure 6:
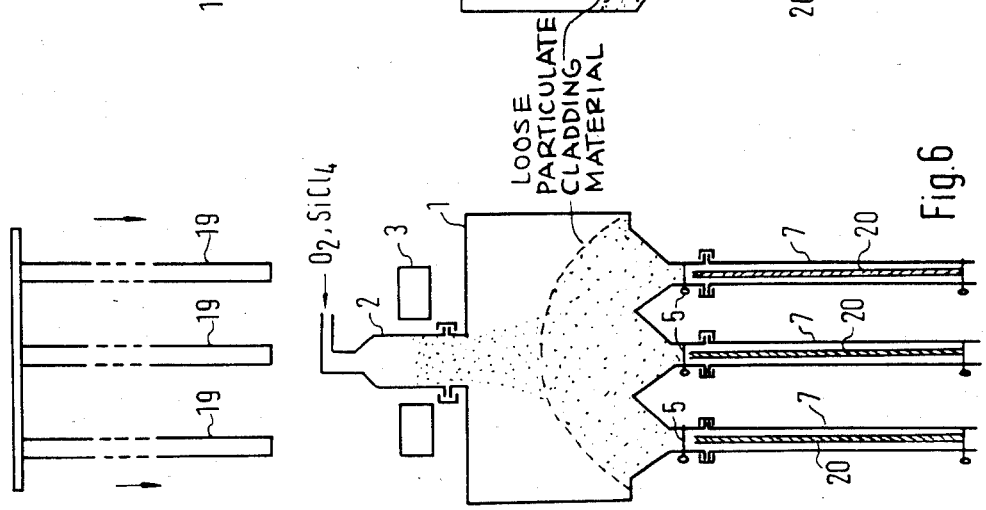

In the following discussion, there will now be explained some possibilities for depositing cladding material onto a sintered or unsintered substrate body. In the arrangements as shown in FIGS. 6, 7 and 8, loose particulate cladding material is produced and allowed to accumulate in a collecting trough 1 corresponding to that described above in connection with FIGS. 1, 2 and 3, with the processes only differing with respect to the composition of the reagents from the processes for producing the core material as described herein before with reference to FIGS. 1 to 3. FIGS. 6 and 7, similarly to FIGS. 1 and 2, show rigid compression molds 7 in the center of which the substrate body 20, onto which the cladding material is to be deposited by way of pressing, is positioned. The cladding material contained in its particulate state in the collecting trough 1 can be filled into the interspace or gap between the substrate body 20 of core material and the compression mold 7 when the slides 5 are opened, and compressed into the shape of a solid cladding body adhering to the substrate body 20 by being pressed in the longitudinal direction. As a plunger for effecting the pressing in the longitudinal direction or for the uniaxial pressing, it is advantageous to use an annular plunger 19 whose center bore diameter corresponds to or slightly exceeds the diameter of the substrate body 20 of core material.

It will be appreciated that exact arrangement of the substrate body 20 of core material in the center of the rigid compression mold 7 can easily be accomplished by employing the usual adjusting means, for example, set-screws acting in the radial direction.

In all other respects, the pressing process described with reference to FIGS. 6 and 7, corresponds exactly to that described with reference to FIGS. 1 and 2, so that a detailed explanation is deemed unnecessary.

A further possibility for depositing the cladding material onto the substrate body of core material in the course of a pressing process is shown in FIG. 8 which, just like FIG. 3, shows the so-called isostatic press including a flexible compression mold 11. In this compression mold 11 which, as in FIG. 3, is constituted by a flexible hose member, the substrate body 20 of core material is secured in the center thereof with the aid of not particularly shown mounting means, with the loose particulate cladding material contained in the collecting trough 1 being intended to be pressed onto this substrate body 20 of core material. This loose particulate cladding material can be filled into the interspace or gap remaining between the substrate body 20 and the hose member 11 and, after closing the upper and the lower ends of the latter, can be compressed into a solid cladding body surrounding the substrate body 20 by applying a radial pressure upon the outside walls of the hose member 11 inside the pressure chamber or isostatic press 13.

Finally, there is still to be mentioned a possibility as to how the substrate body 20 can be provided with the cladding material without having to deposit the latter in the course of a pressing process. According to this possibility, similarly to what was described with reference to FIG. 5a relating to the core material, a thick plate-shaped body of cladding material is produced, from which a tubular cladding body is bored, which is to be slipped onto the rod-shaped substrate body of core material and fused therewith.

In order to reduce the impurity content at the interface between the substrate body and the thus attached body of cladding material, the surfaces of both bodies which are to be brought into contact with one another are cleaned if so required.

It should still be mentioned that the cladding material can also be deposited in a manner known per se, by way of flame hydrolysis, onto the substrate body which is produced by employing the processes described hereinbefore.

The further processing of the substrate body of core material which is now surrounded by the cladding material, includes turning from the solid of the thus obtained body and, if so required, fusing thereon of a so-called sleeve tube, as well as uniform stretching into a preform which is thin enough to be drawn directly into the glass fiber from one heated end in the manner known per se.

As to the processes described hereinbefore with reference to FIGS. 1, 2, 3, 6, 7 and 8, it should still be mentioned for the sake of clarity that, instead of the shown single reaction tube 2 or flame-hydrolysis burner 10, several such components can be arranged in parallel. The question as to how many reaction tubes for flame-hydrolysis burners, or how many compression molds are used next to each other in parallel, does not affect the principle underlying the invention, and is to be answered exclusively in accordance with the aspects of economy with which the novel process is intended to work.

While I have described above the principles of our invention in connection with specific apparatus it is to be clearly understood that this description is made only by way of example and not as a limitation to the scope of our invention as set forth in the objects thereof and in the accompanying claims.

I claim:

1. A process for manufacturing glass preforms for use in drawing glass fiber optical waveguides therefrom, each having a core of a core material surrounded by a cladding of a cladding material with a refractive index lower than the maximum refractive index of the core material, comprising the steps of reacting a first plurality of initial reactants in their vapor state with one another to produce particles of the core material, producing a complete cohesive core body, including forming a cohesive porous core body from said particles of the core material;

reacting a second plurality of initial reactants in their vapor state with one another to produce particles of the cladding material;

providing a cohesive porous cladding body from said particles of the cladding material around said complete cohesive core body to thereby form a composite body, including accumulating the particles of the cladding material remotely from said complete cohesive core body, and forming the cohesive porous cladding body from the accumulated particles; and sintering the cohesive core body and the cohesive porous cladding body into the glass preform.

2. The process as defined in claim 1, wherein said providing step includes as said accumulating and forming steps thereof depositing said particles of the cladding material on a substrate to form a firm porous body thereon and shaping the firm porous body into a tubular cohesive porous body, and as an additional step placing the tubular cohesive porous body around said core body to constitute said cohesive porous cladding body thereat.

3. The process as defined in claim 1, wherein each of said reacting steps includes performing the respective reactions in a confining zone, and causing the respective particulate material to leave said confining zone prior to the performance of the respective one of said forming and providing steps.

4. The process as defined in claim 1, wherein each of said reacting steps includes performing the respective reactions in the flame of a flame-hydrolysis burner.

5. The process as defined in claim 1, wherein said forming step of said producing step includes confining a quantity of the particulate core material in a confining zone, and exerting pressure on the confined quantity of the particulate core material.

6. A process for manufacturing glass preforms for use in drawing glass fiber optical waveguides therefrom, each having a core of a core material surrounded by a cladding of a cladding material with a refractive index lower than the maximum refractive index of the core material, comprising the steps of reacting a first plurality of initial reactants in their vapor state with one another to produce particles of the core material, producing a cohesive porous core body from said particles of the core material, including confining a quantity of the particulate core material in a confining zone by introducing the quantity of the particulate core material into an elongated rigid mold cavity that constitutes said confining zone, and exerting pressure on the confined quantity of the particulate core material by applying pressure to the confined quantity of the particulate core material in the longitudinal direction of said cavity;

reacting a second plurality of initial reactants in their vapor state with one another to produce particles of the cladding material;

providing a cohesive porous cladding body from said particles of the cladding material around said core body to thereby form a composite body; and sintering the cohesive core body and the cohesive porous cladding body into the glass preform.

7. A process for manufacturing glass preforms for use in drawing glass fiber optical waveguides therefrom, each having a core of a core material surrounded by a cladding of a cladding material with a refractive index lower than the maximum refractive index of the core material, comprising the steps of reacting a first plurality of initial reactants in their vapor state with one another to produce particles of the core material, producing a cohesive porous core body from said particles of the core material, including confining a quantity of the particulate core material in a confining zone by introducing the quantity of the particulate core material into a flexible tubular mold cavity that constitutes said confining zone, and exerting pressure on the confined quantity of the particulate core material by isostatically applying external pressure to the flexible tubular mold and through the same to the confined quantity of the particulate core material;

reacting a second plurality of initial reactants in their vapor state with one another to produce particles of the cladding material;

providing a cohesive porous cladding body from said
particles of the cladding material around said core
body to thereby form a composite body; and
sintering the cohesive core body and the cohesive
porous cladding body into the glass preform.

8. The process as defined in claim 1, wherein said forming step of said producing step includes depositing the particulate core material on a support to provide a firm porous body thereon, and shaping the firm porous body into said cohesive porous core body.

9. A process for manufacturing glass preforms for use in drawing glass fiber optical waveguides therefrom, each having a core of a core material surrounded by a cladding of a cladding material with a refractive index lower than the maximum refractive index of the core material, comprising the steps of
reacting a first plurality of initial reactants in their vapor state with one another to produce particles of the core material,
producing a cohesive porous core body from said particles of the core material, including depositing the particulate core material on a support to provide thereon a firm porous body having a substantially plate-shaped configuration extending along a plane and having a thickness substantially corresponding to the desired diameter of the cohesive porous core body, and shaping the firm porous body into said cohesive porous core body by working the cohesive porous core body out of the firm porous body in a direction extending along said plane;
reaching a second plurality of initial reactants in their vapor state with one another to produce particles of the cladding material;
providing a cohesive porous cladding body from said particles of the cladding material around said core body to thereby form a composite body; and
sintering the cohesive core body and the cohesive porous cladding body into the glass preform.

10. A process for manufacturing glass preforms for use in drawing glass fiber optical waveguides therefrom, each having a core of a core material surrounded by a cladding of a cladding material with a refractive index lower than the maximum refractive index of the core material, comprising the steps of
reacting a first plurality of initial reactants in their vapor state with one another to produce particles of the core material,
producing a cohesive porous core body from said particles of the core material, including depositing the particulate core material on a support to provide thereon a firm porous body having a substantially plate-shaped configuration extending along a plane and having a thickness substantially corresponding to the desired length of the cohesive porous core body, and shaping the firm porous body into said cohesive porous core body by working the cohesive porous core body out of the firm porous body in a direction extending normal to said plane;
reacting a second plurality of initial reactants in their vapor state with one another to produce particles of the cladding material;
providing a cohesive porous cladding body from said particles of the cladding material around said core body to thereby form a composite body; and
sintering the cohesive core body and the cohesive porous cladding body into the glass preform.

11. The process as defined in claim 1, wherein said producing step includes sintering said cohesive porous core body into said cohesive body prior to said providing step.

12. The process as defined in claim 1, wherein said providing step includes combining said cohesive porous core body with said cohesive porous cladding body; and wherein said sintering step includes simultaneously sintering said cohesive porous core and cladding bodies into the preform.

13. The process as defined in claim 1; and further comprising the steps of exposing said cohesive core body to an atmosphere containing chlorine; and subjecting said cohesive core body to a heat treatment during said exposing step.

14. The process as defined in claim 1, wherein said reacting steps include carrying out the respective reactions in a pure atmosphere segregated from the environment; and wherein said producing and providing steps include collecting the respective particles prior to further processing thereof in respective high-purity collecting zones.

15. A process for manufacturing glass preforms for use in drawing glass fiber optical waveguides therefrom, each having a core of a core material surrounded by a cladding of a cladding material with a refractive index lower than the maximum refractive index of the core material, comprising the steps of
reacting a first plurality of initial reactants in their vapor state with one another to produce particles of the core material,
producing a cohesive core body, including forming a cohesive porous core body from said particles of the core material;
reacting a second plurality of initial reactants in their vapor state with one another to produce particles of the cladding material;
providing a cohesive porous cladding body from said particles of the cladding material around said core body to thereby form a composite body, including positioning said cohesive core body concentrically in an elongated rigid mold cavity having transverse dimensions exceeding the corresponding dimensions of the cohesive core body such that a gap is formed in said cavity around said cohesive core body, introducing a quantity of the particulate cladding material into the gap, and compressing the quantity of the particulate cladding material in the longitudinal direction of said cavity; and
sintering the cohesive core body and the cohesive porous cladding body into the glass preform.

16. A process for manufacturing glass preforms for use in drawing glass fiber optical waveguides therefrom, each having a core of a core material surrounded by a cladding of a cladding material with a refractive index lower than the maximum refractive index of the core material, comprising the steps of
reacting a first plurality of initial reactants in their vapor state with one another to produce particles of the core material,
producing a cohesive core body, including forming a cohesive porous core body from said particles of the core material;
reacting a second plurality of initial reactants in their vapor state with one another to produce particles of the cladding material;
providing a cohesive porous cladding body from said particles of the cladding material around said core body to thereby form a composite body, including positioning said cohesive core body concentrically in an elongated flexible tubular mold cavity having transverse dimensions exceeding the corresponding dimensions of said cohesive core body such that a gap is formed in said cavity around said cohesive core body, introducing a quantity of the particulate cladding material into the gap, and isostatically applying external pressure to the flexible tubular mold and through the same to the quantity of the particulate cladding material present in said gap; and sintering the cohesive core body and the cohesive porous cladding body into the glass preform.

17. The process as defined in claim 1, wherein said producing and providing steps include mechanical rounding respectively of said cohesive core body and of said cohesive porous cladding body prior to said sintering step.

* * * * *